Feb. 23, 1960    O. J. MORELOCK    2,926,302
ELECTRON TUBE TESTER

Filed April 28, 1955                    3 Sheets-Sheet 1

OLIVER JAMES MORELOCK
INVENTOR.

BY
Rudolph J. Junick
ATTORNEY

Feb. 23, 1960     O. J. MORELOCK     2,926,302
ELECTRON TUBE TESTER

Filed April 28, 1955     3 Sheets-Sheet 3

9 SELECTOR SWITCHES
POSITION CIRCUIT CONNECTION

LEAKAGE TEST
SWITCH
MEASURES LEAKAGE BETWEEN

OLIVER JAMES MORELOCK
INVENTOR.

BY
Rudolph J. Junick
ATTORNEY

United States Patent Office 2,926,302
Patented Feb. 23, 1960

2,926,302

ELECTRON TUBE TESTER

Oliver James Morelock, Millington, N.J., assignor, by mesne assignments, to Daystrom Incorporated, Murray Hill, N.J., a corporation of New Jersey Application April 28, 1955, Serial No. 504,404

11 Claims. (Cl. 324—23)

This invention relates to a method and apparatus for testing electron tubes and more particularly to a novel method and apparatus for measuring the leakage resistance between the electrodes of a vacuum tube.

It is now standard practice to test vacuum tubes for short-circuited conditions between one or more of the tube electrodes. However, such qualitative tests, while useful in determining wholly defective tubes, provides no criterion of tube quality in cases where a direct inter-electrode short circuit does not exist. More specifically, a tube may not be satisfactory for operation at maximum efficiency when the leakage resistance between its electrodes is less than a predetermined value. This is particularly true of the new 5000 hour, ruggedized tubes wherein the minimum inter-electrode leakage resistance should exceed 5 megohms.

Leakage resistance between vacuum tube electrodes is caused by any one of several factors such as, carbonizing of the mica electrode spacers, interpin base resistance, ionization of the conduction path, etc. Apparatus for testing the leakage resistance between any two electrodes should desirably provide a direct measurement, or indication, of the actual resistance between electrodes in ohms or megohms. Also, and importantly, such apparatus must be capable of providing such measurement, or indication, when the tube is subjected as nearly as possible to its actual operation condition and to the exclusion of other effects which might tend to obscure, or vary, the actual leakage resistance factor.

In practicing my invention, the tube under test is first heated to a preselected filament temperature and all leakage measurements are made with the tube heater energized so that increased leakage conditions, aggravated by heat conduction from the filament, may be detected. Means are provided for selectively isolating each tube electrode from the other electrodes and for applying a fixed D.-C. voltage between the isolated electrode and the remaining electrodes, the polarity of such voltage being opposite to that normally applied to the tube in operation. A calibrated D.-C. microammeter is used to indicate the ohmic resistance between the isolated electrode and all other electrodes which temporarily are tied together. A D.-C. voltage of approximately 100 volts allows for ample instrument sensitivity in the range of normal vacuum tube operating potentials yet is not too high to cause internal short circuit indications due to the electrostatic attraction of the small battery filaments. The use of a D.-C. test voltage also avoids erroneous indications due to inter-electrode capacitance between the heater and cathode sleeve, particularly in indirectly heated type tubes.

The leakage resistance test circuit, to be described hereinbelow, is part of a more complex tube testing circuit including a plurality of switches for conditioning the apparatus to make selected tests on any particular type of vacuum tube.

An object of this invention is the provision of a method and apparatus for the direct ohmic measurement of the leakage resistance between selected electrodes of a vacuum tube.

An object of this invention is the provision of a method and apparatus for measuring the leakage resistance between selected electrodes of a vacuum tube under conditions tending to aggravate the leakage factor, as by making the measurement while the tube filament remains heated at a predetermined temperature.

An object of this invention is the provision of apparatus for measuring the leakage resistance between selected electrodes of a vacuum tube comprising means to energize the tube filament at rated voltage, means to electrically isolate a selected electrode and to connect together all other electrodes, a source of D.-C. voltage, circuit elements for applying the voltage across the isolated electrode and the connected electrodes in a polarity sense opposite to that applied to the isolated electrode during normal operation of the tube, and a calibrated instrument connected in series between the source of voltage and the space path between the isolated and connected electrodes.

An object of this invention is the provision of electron tube testing apparatus comprising a socket for holding a tube under test, a transformer energizable from a 60 cycle power line and having a multi-tapped secondary winding serving as voltage sources, circuit elements including manually operable switch means for connecting the tube electrodes to the voltage sources and thereby energizing the tube electrodes at rated values, an indicating instrument having a plurality of scales calibrated in terms of tube transconductance, plate current and resistance values, switch means operable to connect the instrument into the circuit for the selective measurement of tube transconductance, a source of D.-C. voltage, switch means operable to electrically isolate a selected tube electrode and connect together all other tube electrodes and to connect the instrument in series between the D.-C. voltage source and the space path between the isolated and connected electrodes, switch means to connect the instrument across selected taps of the said secondary winding, and means for adjusting the voltage across the said selected transformer taps to bring the instrument pointer into alignment with a reference mark on the scale.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
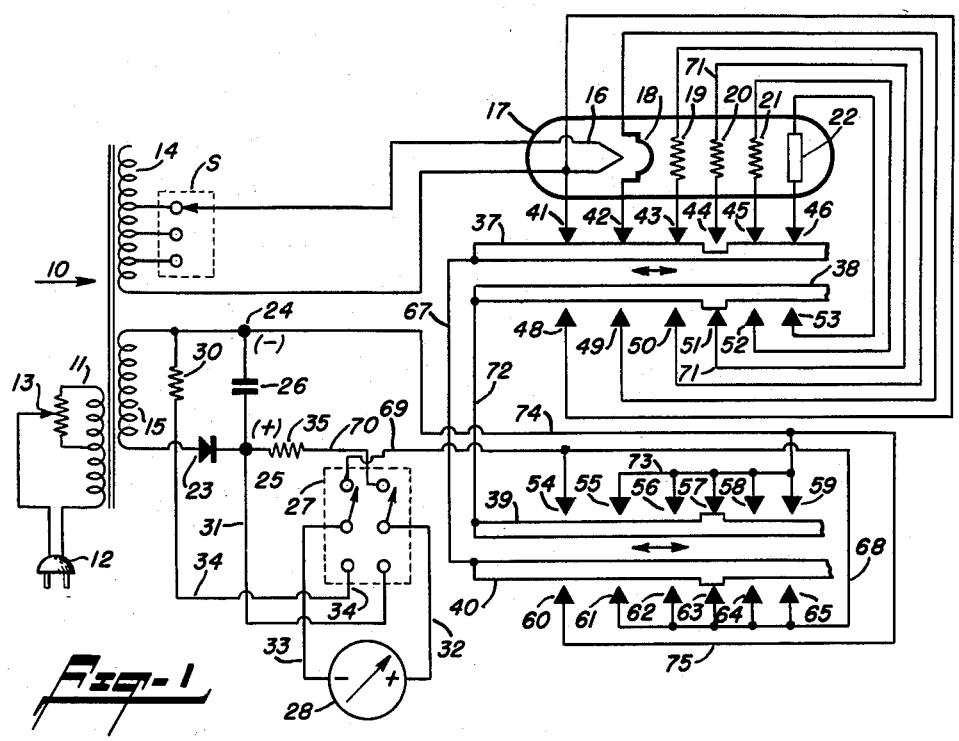
Figure 1 is a diagrammatic presentation of the apparatus used for making direct measurements of the leakage resistance between selected electrodes of a vacuum tube.

Reference is now made to Figure 1 wherein there is shown a transformer 10 having a primary winding 11 adapted for energization from a conventional 120 volt, 60 cycle power line by means of the connector plug 12. An adjustable rheostat 13 serves to control the voltage output of the transformer secondary windings 14 and 15.

The secondary winding 14 includes several taps whereby the rated voltage may be applied to the heater 16 of a particular tube 17 under test, such voltage selection being obtained by means of a manually-operable switch S. It is here pointed out that the heater of the tube remains energized during the period in which the inter-electrode leakage resistance measurements are made. The representative tube here shown includes a cathode 18, control grid 19, screen grid 20, suppressor grid 21 and anode 22.

Figure 2:
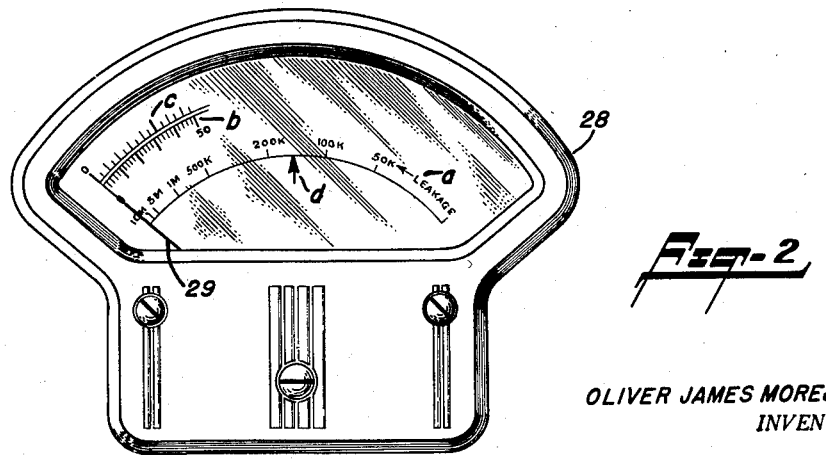
Figure 2 illustrates the calibrated scale of the measuring instrument.

The voltage developed in the transformer secondary winding 15 is rectified by a rectifier 23, and the circuit components are designed to provide a voltage of 100 volts D.-C. across the terminals 24, 25, a smoothing condenser 26 also being connected across said terminals in accordance with conventional practice. A double-pole, double-throw switch 27 serves to connect the indicating instrument 28 either across the D.-C. voltage terminals 24, 25, or in series with the leakage test circuit. As shown in Figure 2, the instrument is provided with a pointer 29 cooperating with a plurality of calibrated scales; namely, scale "a" calibrated in resistance values, scale "b" calibrated in current values and scale "c" calibrated in terms of tube transconductance (gm) values. The switch 27 is of the spring-biased type arranged to be normally closed in the upward position, that is, the switch will be closed in the downward position only when the operating lever, or button, is retained depressed by the operator.

When the switch 27 is closed in the downward, or lower, position, the instrument is connected across the terminals 24, 25 through the resistor 30, the circuit being traceable as follows; positive (+) terminal 25, lead 31, right hand movable blade of switch 27, lead 32, instrument 28, lead 33, left hand movable blade of switch 27, lead 34 and resistor 30 to negative (—) terminal 24. The value of the resistor 30 and the deflection characteristics of the indicating instrument, are such that the pointer of the indicating instrument will register with a reference mark "d" on the instrument scale when 100 volts D.-C. is available at the terminals 24, 25. Adjustment of the voltage to this value, if necessary, can be made by adjusting the rheostat 13. Having so standardized the D.-C. voltage, the operator releases the lever of the switch 27 whereby the switch closes in the upward position and the indicating instrument is connected in series with the current limiting resistor 35.

In making leakage resistance measurements, the D.-C. voltage is applied between a selected one of the tube electrodes and the remaining electrodes which are connected together electrically. The electrode selection is accomplished by a setting of suitable, manually-operable selector switch here shown diagrammatically as four (4) metallic bars 37, 38, 39 and 40 movable as a unit to the left or right. The uppermost bar 37 is adapted for sliding contact with all except one of the associated stationary contacts 41–46, inclusive, each such stationary contact being connected to one of the tube electrodes. The adjacent bar 38 cooperates with a plurality of stationary contacts 48–53, inclusive, which contacts are likewise individually connected to the tube electrodes; in this case, however, the bar 38 is arranged to contact only one of the associated contacts. The lower bars 39 and 40, arranged to contact any one of the respectively associated stationary contacts 54–59 and 60–65 constitute a polarity reversing switch.

With the selector switch set in the position shown in Figure 1, it will be apparent that all of the tube electrodes are electrically connected together (through the slide bar 37) with the exception of the screen grid 20. All such tied-together electrodes are connected to the positive (+) terminal 25 of the D.-C. voltage source, the circuit being traceable as follows; slide bar 37, lead 67, slide bar 40, contact 63, leads 68, 69, left hand blade of switch 27, lead 33, instrument 28, lead 32, right hand blade of switch 27, lead 70 and resistor 35. On the other hand, the selected, isolated electrode 20 is connected to the negative (—) side of the voltage, the circuit being traceable as follows: lead 71, stationary contact 51, slide bar 38, lead 72, slide bar 39, stationary contact 57, jumper 73 and lead 74. Thus, it is apparent that 100 volts D.-C. is impressed between the screen grid 20 and all other tube electrodes and that the pointer of the instrument 28 will deflect to an extent depending upon the actual resistance between the grid 20 and all other electrodes. With the scale "a" of the instrument calibrated as shown in Figure 2 the instrument provides a direct reading of such resistance, in ohms.

If the selector switch is moved one position to the right the circuit remains as just described but in this case the screen grid 20 will be tied electrically to the other electrodes whereas the suppressor grid 21 will be isolated and connected to the negative (—) side of the D.-C. voltage. Similar considerations hold for all positions of the selector switch with the exception of the left hand limiting position. With the slide bars of the selector switch moved fully to the left, the tube heater 16 is isolated from all other electrodes and the polarity of the D.-C. voltage impressed across the heater and the other electrodes is reversed since the lowermost slide bar 40 now is in contact with the stationary contact 60 that is connected to the negative lead 74 by the lead 75. At the same time, the slide bar 39 is in contact with the positive (+) lead 69 through the stationary contact 54.

From the above description it will be apparent that I have provided a simple arrangement for obtaining the ohmic values of the leakage resistance between any one selected tube electrode and all other electrodes and under an aggravated condition, that is, with the tube heater energized at rated or other preselected value. In practice, the selector switch preferably is of the multi-deck, rotary type provided with a suitable position-indexing arrangement and an appropriately marked reference plate whereby the operator will know at all times which particular tube electrode is isolated for test purposes.

Although the inter-electrode leakage test circuit, just described, may be housed within a suitable case to form a separate piece of test apparatus, it is, of course, preferable to incorporate such circuit in a general purpose tube tester. Such tube tester will include a plurality of sockets to individually accommodate any standard radio tube, and circuit components and switching means operable to measure the tube transconductance factor, and plate current flow at normal energizing voltages.

Figure 3:
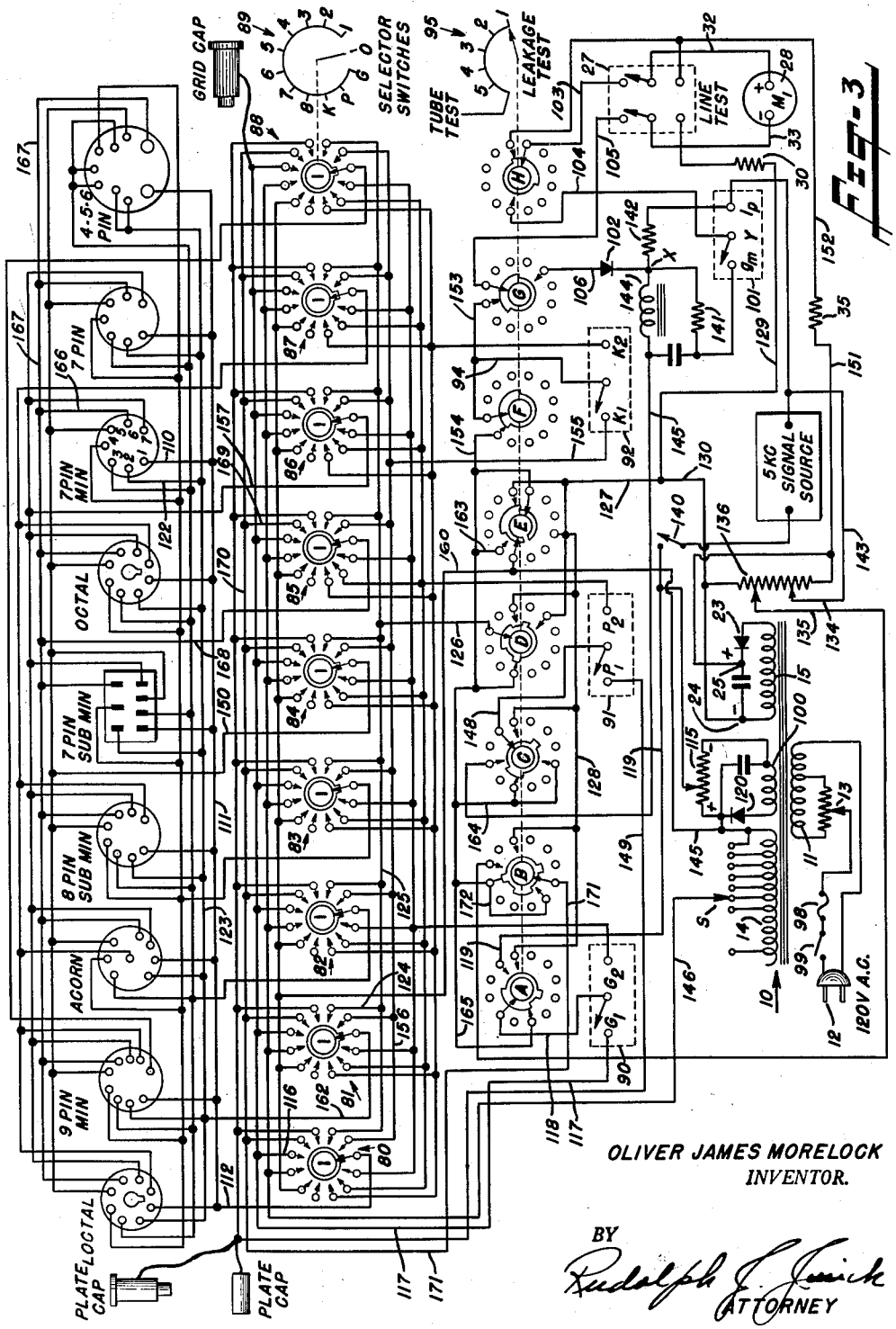
Figure 3 is a circuit diagram of a tube tester incorporating the leakage measurement circuit.
Figure 4:
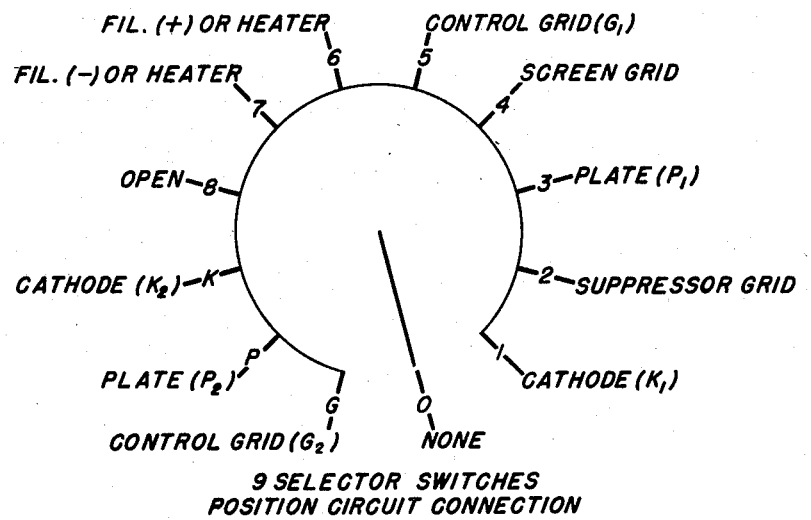
Figure 4 illustrates the position markings associated with the various selector switches and the functional character of each such marking.

The basic diagram of a tube tester made in accordance with this invention and incorporating the leakage resistance test circuit is shown in Figure 3 to which reference is now made. It is pointed out, however, the diagram is simplified for purposes of illustration by omitting therefrom such components as are not necessary to an understanding of the invention or which are more or less standard in conventional tube testers. The apparatus is provided with a plurality of standard tube sockets identified on the drawing as Loctal, 9 Pin Min., Acorn, etc., the individual sockets serving to accommodate the particular tube to be tested and the entire complement of sockets adapting the apparatus to test all standard radio tubes. There are also provided suitable grid and plate caps by which energizing potentials may be applied to those tubes wherein the grid or plate electrode is connected to a terminal at the top of the tube. A series of nine (9) selector switches 80–88 are provided for selectively connecting each pin of the sockets to the proper functional part of the circuit thereby to apply rated energizing potentials to all of the tube electrodes. A marked plate 89 is associated with one or all of the selector switches to indicate the functional connection of the switches when the switch-control knob is set to any of the corresponding positions, see also Figure 4. Specifically, all of the switches 80–88 are shown set in the 0 position, that is, wherein the rotary switch contacts are not engaging any of the effective stationary contacts. If it be assumed that a tube is inserted into the Loctal socket the movement of selector switch 80 to the number 1 position, will result in the connection of the tube No. 1 pin to the cathode testing point in the voltage circuit of the apparatus. Similarly, the movement of selector switch 81 to the No. 2 position will connect pin No. 2 of the tube to the proper point in the circuit for applying voltage to the suppressor grid, the movement of switch 82 to the No. 5 position will connect the No. 3 pin of the tube to the control grid circuit, etc.

Figure 5:
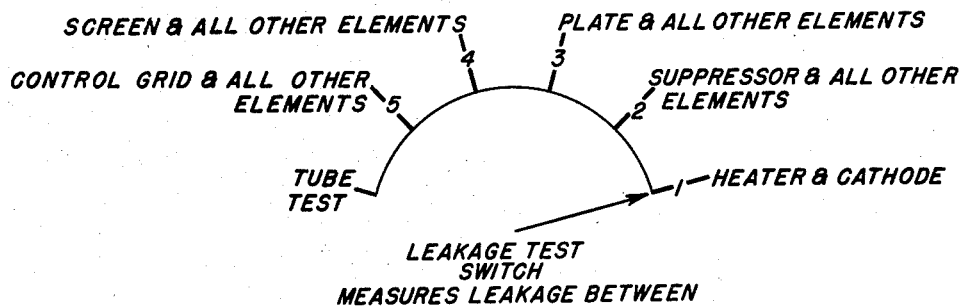
Figure 5 is a similar illustration of the leakage test switch.

Before proceeding to trace representative circuits established by the selective positioning of the selector switches, it appears desirable to point out that certain dual tubes have two cathodes, two control grids and two plates. In order to test first one and then the other of these dual sets of electrodes, there are provided snap switches 90, 91, 92 appropriately marked $G_1$, $G_2$, $P_1$, $P_2$, and $K_1$, $K_2$. These switches are independently operated and when closed to the left position the first set of dual electrodes are functionally connected into the circuit whereas a closure of these switches to the right position connects the second set of electrodes into the same circuit. Further, the switch for making leakage resistance measurements is here shown as a rotary, gang-operated multi-deck switch having each deck identified by the letters A, B, C, . . . H. Associated with this switch is an index plate 95 marked with six (6) positions, see also Figure 5. The switch is shown in the No. 1 position which conditions the circuit for the measurement of the leakage resistance between the tube heater and cathode, as will be described in detail hereinbelow. Similarly, the setting of the rotary gang switch to the No. 2 position conditions the circuit for the measurement of the leakage resistance between the suppressor grid and all other electrodes.

To summarize to this point, a tube to be tested is inserted into the proper socket, the individual selector switches 80, 81, 82, 83, 84, 85, 86, 87 and 88, each set to different positions to thereby energize each of the tube electrodes at the proper voltage for purposes of measuring the transconductance and plate current flow of the tube. The snap switches 90-92 select the desired set of electrodes of a dual purpose tube and the Leakage Test switch (having the decks A . . . H) conditions the circuit for inter-electrode leakage resistance measurements. The selector switches 80-88, as a group, and the 8-deck Leakage Test switch may be considered as mutually exclusive. Specifically, when transconductance and plate current measurements are to be made the Leakage Test switch is set to the Tube Test position whereas when leakage resistance measurements are to be made the selector switches 80-88 are each set to the 0 (zero) position. When the Leakage Test switch is set to the Tube Test position all of the electrodes of the tube under test (with the exception of the heater) are segregated and independently connected to their respective functional circuits.

As has already been described with reference to Figure 1, the apparatus is powered by a transformer 10 having a primary winding 11 energized from a 60 cycle power line through the connector plug 12. A conventional line switch 99 and protective fuse 98 are provided and the voltage output of the various transformer secondary winding 14, 15, 100, is adjustable by means of the rheostat 13. The secondary winding 14 includes a plurality of taps arranged to provide specific voltage magnitudes corresponding to the various rated heater voltages of radio tubes, a particular voltage magnitude being selected by a proper setting of the switch S. The latter switch preferably has associated therewith an index plate marked with such specific voltage magnitudes. For example, if a tube under test has a rated filament or heater voltage of 2.5 the switch S is merely set to the 2.5 marking on the plate. The transformer windings are accurately wound so that precisely 2.5 volts will be applied to such tube heater when the voltage across the transformer primary winding is a precise, predetermined magnitude. In view of possible fluctuations in the line voltage period adjustments of the rheostat 13 may be necessary. This is done simply by closing the spring-biased switch 27 in the downward position (thereby connecting the single indicating instrument 28 across the D.-C. voltage terminals 24, 25 through the series resistor 30) and adjusting the rheostat 13 until the instrument pointer is brought into alignment with the fixed reference mark "d" on the scale (see Figure 2). Such connection of the instrument for voltage-adjustment purposes may be done at any time prior to and during the actual testing of a tube.

In a tube tester made according to my invention, a single D.-C. indicating instrument serves four (4) purposes; namely, (1) To check line voltage in order to maintain precise voltage magnitudes on the transformer secondary windings, (2) To provide a direct indication of the interelectrode leakage resistance in ohms, (3) To provide a measure of tube transconductance in micromhos, and (4) To provide a measure of plate current flow.

With the Leakage Test switch set in the Tube Test position the instrument 28 is removed from the leakage measuring circuit and connected to the points X and Y through the rectifier 102 to measure either tube transconductance ($gm$) or plate current ($Ip$), the circuit being traced as follows; positive (+) instrument terminal, lead 32, closed right hand side of switch 27, lead 103, deck H of Leakage Test switch and lead 104 that is connected to the movable contact of the single-pole, double-throw switch 101; also from the (—) negative instrument terminal, lead 33, left hand side of switch 27, lead 105, deck G of Leakage Test switch, lead 106 and rectifier 102. The specific connection of the instrument for the measurement of either ($gm$) or ($Ip$) is controlled by the correspondingly-marked switch 101.

It is believed that a complete understanding of the apparatus will be had by describing the actual operation of the device when testing a representative tube such as, for example, a type 6AG5 inserted into the socket identified as 7 Pin Min. The selector switches 80-88 each have their movable contact blade connected to a given pin on each of the tube sockets. In the case under consideration the socket pin No. 1 is connected to the movable blade of the switch 80 by the wire 110, jumper 111 and wire 112. Similarly, socket pin No. 2 is connected to the movable blade of the switch 81, socket pin No. 3 is connected to the movable blade of switch 82, etc. The electrodes of the tube are connected to the tube pins in a standard order. The relationship between the tube electrodes, movable contacts of the selector switches and the tube electrodes are as follows:

| Socket Pin No. | Selector Switch No | Tube Electrode |
| --- | --- | --- |
| 1 | 80 | control grid. |
| 2 | 81 | suppressor grid. |
| 3 | 82 | Heater (—). |
| 4 | 83 | Heater. |
| 5 | 84 | plate. |
| 6 | 85 | screen grid. |
| 7 | 86 | cathode. |

Thus, only the first seven (7) selector switches 80-86 are required to connect all of the tube electrodes into the operative portion of the circuit. For different tubes under test a different combination of the selector switches is required for this purpose. In any event, it will be noted that there are nine (9) selector switches corresponding to the maximum number of pins on any socket. A suitable chart, furnished with the apparatus, can be referred to by the user in order to determine which selector switches are to be set for the testing of a particular tube.

Each of the stationary contacts of the selector switches 80-88 are connected to proper voltage points in the circuitry. For example, a setting of any selector switch to the No. 5 position will contact the movable contact of such switch with that stationary contact which is connected to the negative (—) side of the grid bias source. Continuing with the example under consideration, and remembering that the control grid socket pin No. 1 is connected to the movable blade of selector switch 80, the operator sets the switch 80 to the number 5 position. This connects the tube control grid to the negative voltage output terminal of the potentiometer 115, the circut being traceable as follows: socket pin No. 1, lead 110, jumper 111, lead 112, switch 80, lead 116, switch 90, lead 118, deck A of Leakage Test switch (which is now set to the Tube Test position) and lead 119 that is connected to the slider of the potentiometer 115. A D.-C. voltage is applied across the input terminals of the potentiometer 115 by reason of the rectifier 120 and one output terminal of the potentiometer is connected to an end of the heater winding 14. Although only shown schematically in the drawing, the grid potentiometer 115 is provided with a dial calibrated in voltage values whereby selected voltage magnitudes are provided at the potentiometer output terminals upon a setting of the slider. Such selected grid potential corresponds to the normal bias to be applied to the control grid of the tube under test. As has already been explained, the precise voltage magnitude is maintained by adjustment of the rheostat 13 to align the instrument pointer with the reference mark on the scale when the spring biased switch is depressed to close in the Line Test position.

A negative bias is applied to the suppressor grid of the tube by setting selector switch 81 to the No. 2 position, the circuit being traced as follows: socket pin No. 2, lead 122, jumper 123, switch 81, lead 124, jumper 125, lead 126, deck D of Leakage Test switch, lead 127, and lead 130 that is connected to the negative (—) terminal 24. It is believed unnecessary to specifically trace the heater circuits. Suffice to say that the switch 82 is set to the No. 6 position thereby connecting the ± end of the transformer secondary winding 18 to the heater socket pin No. 3 and the switch 83 is set to the No. 7 position thereby connecting the movable contact of the heater-voltage selector switch 18 to the heater socket pin No. 4. Thus, a setting of the switch S to the proper mark on the associated dial plate will apply the rated voltage to the tube heater through the switches 82 and 83. Similarly, the setting of the selector switch 84 to the No. 5 position connects the plate of the tube under test to the slider 134 of the potentiometer 136; the setting of the selector switch 85 to the No. 6 position connects the tube screen grid to the slider 135 of the potentiometer 136, and the setting of the selector switch 86 to the No. 1 position connects the tube cathode to the ± end of the heater winding 14. The potentiometer 136 is also provided with suitably calibrated dials carrying voltage markings whereby each of the potentiometer sliders 134, 135 can be set to a selected voltage marking corresponding to the rated voltage to be impressed respectively on the tube plate and control grid. As has already been explained, the precise magnitudes of such voltages are maintained by depressing the switch 27 and adjusting the rheostat 13 to align the pointer of the instrument 28 with the fixed reference mark on the scale.

The tube under test now has all of its electrodes energized at rated potential values and the switch 101 is closed to the "gm" position. Closure of the switch 140 applies a signal to the grid circuit of the tube under test, such signal having a frequency of 5 or 10 kilocycles. Such high frequency signal is superimposed on the normal D.-C. grid voltage through the lead 119. The resulting 5 kilocycle component of the plate current flows through the resistor 141 and a corresponding D.-C. potential appears across the circuit points Ⓧ and Ⓨ. Since the meter 28 is connected across these points upon closure of the switch 101 to the "gm" position, the meter will respond to the 5 kilocycle component of the plate current resulting from the application of the A.-C. grid signal. With a measured amount of grid signal the pointer of the meter deflects to an extent proportional to the transconductance of the tube under test and the meter scale "b" can, therefore, be calibrated directly in micromhos.

The particular circuitry and technique for obtaining a direct measurement of the tube transconductance is not part of this invention and the specific "gm" measurement circuit just described is presented only to illustrate the versatility of my apparatus wherein a single instrument and appropriate switching means serve a plurality of desirable functions. The same consideration applies to the measurement of tube plate current flow which is obtained by now closing the switch 101 to the "Ip" position and opening the grid signal switch 140. With the switch 101 closed to the "Ip" position the instrument 28 is connected across the shunt resistor 142. The plate current flows from the transformer secondary winding 15, lead 143, shunt resistor 142, reactor 144, lead 145, deck C of the Leakage Test switch, the common contact of switch 91 and thence to either the 1st or 2nd anode of the tube, as required.

Having described the functional aspects of the apparatus for tube transconductance and plate current measurements, there remains to be described the interelectrode leakage resistance measurements. The selector switches 80-86 remain set in the individual positions as described hereinabove since it is these switches which connect the pins of the tube socket (and, therefore, the electrodes of the tube under test) to the various sources of voltage; namely, the secondary windings of the transformer. It will be noted that the filament, or heater, voltage (developed in the transformer winding 14 and appearing across the leads 145 and 146) is applied directly to the jumpers connecting the stationary contacts of the various selector switches without passing through the Leakage Test switch. Specifically, the ± lead 145 is connected directly to the jumper connecting together all stationary selector switch contacts corresponding to selector switch position No. 7, and the heater lead 146 is connected directly to the adjacent selector switch contacts corresponding to switch No. 6. Since the selector switches 82 and 83 are set in the No. 7 and No. 6 positions, respectively, the filament of the tube under test remains energized regardless of the setting of the Leakage Test switch. On the other hand, the grid and anode potentials are applied to the selector switch stationary contacts through one or more decks of the Leakage Test switch. For example, the control grid biasing voltage (developed in the transformer winding 100) is applied to the No. 1 pin of the 7 Pin Min. socket through the lead 119, deck A of the Leakage Test switch, lead 118, switch 90, lead 117, lead 116, selector switch 80 (set in the No. 5 position) lead 112 and jumper 111 that is connected to control grid pin No. 1 of the socket. The movable contact blade of deck A is so constructed that the control grid voltage circuit is complete only when the Leakage Test switch is set in the Tube Test position. So too, for example, anode voltage (developed in the transformer winding 15) is applied to the plate pin No. 5 of the socket by the lead 134, resistor 142, inductor 144, lead 145, deck C of Leakage Test switch, lead 148, switch 91, lead 149, selector switch 84 (closed in the No. 3 position) and lead 150 that is connected to plate pin No. 5 of the socket. The movable contact blade of deck C is so designed that the plate voltage circuit is complete only when the Leakage Test switch is set in the Tube Test position. When the Leakage Test switch is set to any position other than Tube Test position, the voltages are removed from the tube electrodes with the exception of the heater which remains energized. It is pointed out that the actual voltage applied to the heater of the tube is determined by a setting of the switch S, the movable arm of such switch being movable over a dial marked in volts. In the normal case, the switch arm will be set to the rated heater voltage of the particular tube. However, it is often desirable to make the interelectrode leakage resistance measurements while the temperature of the heater is either above or below the normal operating value. This, of course, can be done by an appropriate setting of the switch S. In making the leakage resistance measurements, it is again emphasized that the selector switches 80–86 remain in the individual positions to which they were set for the transconductance and plate current measurements. This should be apparent since the rotary contact blades of the selector switches are connected to selected contact pins of the various sockets and the stationary contacts are connected to predetermined voltage sources.

With the Leakage Test switch set to the No. 1 position as shown in the drawing, the circuit is conditioned to measure the resistance between the tube heater and cathode with the indicating instrument 28 connected in series across the 100 volt D.-C. terminals 24, 25. The circuit from the positive (+) voltage terminal 25 is traced as follows: lead 151, current-limiting resistor 35, lead 152, deck H of Leakage Test switch, lead 103, right hand section of switch 27, lead 32, meter 28, lead 33, left hand section of switch 27, lead 105, deck G, lead 153, lead 94, switch 92, lead 155, jumper 156, selector switch 86 (set in the No. 1 position) and lead 157 that is connected to the cathode pin No. 7 of the socket. The negative (−) voltage terminal 24 is connected to the ± heater lead as follows: lead 130, lead 127, deck E of Leakage Test switch and lead 160, that is connected to the heater lead 145. Thus, the position of the instrument pointer relative to the scale "a" (Figure 2) provides a direct reading of the resistance, in ohms, between the tube heater and cathode.

If it now be assumed that the Leakage Test switch is set to the No. 2 position the instrument will measure the resistance between the tube suppressor grid and all other electrodes. In this case the suppressor grid is connected to the negative (−) terminal 24 of the 100 volt D.-C. source, the circuit being traceable as follows, beginning at the terminal 24: lead 130, lead 127, deck D of Leakage Test switch, lead 126, selector switch 81 (set in the No. 2 position), lead 162, and jumper 123 that is connected to the suppressor grid pin No. 2 of the 7 Pin Min. socket. It is here pointed out that when the Leakage Test switch is set to the No. 2 position, the rotary contact blade of deck E disconnects the lead 160 from the lead 127 (thereby breaking the circuit between the negative (−) voltage terminal 24 and the ± heater lead) and connects the lead 160 to the lead 163. Inasmuch as the leads 163 and 94 are each connected to the lead 154 it will be apparent that the tube heater and cathode are now connected together. Also, since there is no change in the circuitry as the Leakage Test switch decks F, G and H are rotated between positions Nos. 1 and 5, the lead 154 remains connected to the positive (+) voltage terminal 25 through the meter 28. Since the plate of the tube under test is connected to the rotary contact blade of the deck C (through the lead 148 and the plate switch 91) it is quite clear that the rotation of deck C to the No. 2 switch position retains the tube plate connected to the lead 154, through lead 164. Similarly, the control grid is connected to the lead 154 by the lead 118, deck A and lead 165. Also similarly, the screen grid of the tube is connected to the lead 154, the circuit being traceable as follows: screen grid socket pin No. 6, lead 166, jumper 167, lead 168, selector switch 85 (set in the No. 4 position), lead 169, jumper 170, lead 171, deck B of Leakage Test switch, and lead 172. Consequently, the tube heater, cathode, screen grid, control grid and anode are connected together and to the positive (+) voltage terminal 25 through the instrument 28, whereas the suppressor grid is isolated from all other tube electrodes and connected to the negative (−) voltage terminal 24. Therefore, the meter 28 will indicate the ohmic resistance between the suppressor grid and the other tube electrodes.

In view of the foregoing description, it is not deemed necessary to present a detailed circuit analysis for the leakage resistance testing of the other tube electrodes upon a setting of the Leakage Test switch (positions Nos. 3, 4 and 5). It may here be pointed out, however, that the calibration of the resistance scale "a" of the instrument involves a consideration of the magnitude of the D.-C. voltage employed in the leakage resistance test circuit. While I prefer to use 100 volts for this purpose (since such voltage will not cause internal short circuit indications due to electrostatic attraction of small battery filaments and allows for ample instrument sensitivity) it will be apparent that other voltage magnitudes may be used.

Having now given a detailed description of my invention it will be apparent that I provide a tube tester having a transformer provided with a plurality of secondary windings for developing various voltages, means to select the proper voltage to be applied to the electrodes of a tube under test, a single D.-C. indicating and circuit conditioning switch whereby the instrument is utilized to check the line voltage applied to the transformer, to measure the transconductance of the tube, to measure the plate current of the tube and to measure the leakage resistance between any selected electrode and all other electrodes of the tube.

Although I prefer to make the tube tester as shown in Figure 3, those skilled in this art will have no difficulty in making certain changes and variations. For example, the selector switches 80–86 can be dispensed with and a conventional patch cord arrangement provided to connect the pins of a tube socket to the functional parts of the circuitry. Also, the calibrated potentiometers 115 and 136 may be replaced by conventional potentiometers having voltmeters connected in the potentiometer output circuits to permit the user to apply the rated voltage to the electrodes of the particular tube under test. These and other changes and modifications may be made without departing from the spirit and scope of the invention as set forth in the following claims.

I claim:

1. Apparatus for measuring the leakage resistance between selected electrodes of an electron tube, said apparatus comprising a source of D.-C. voltage, means to adjust the voltage to a predetermined magnitude, and switch means manually-operable to either show the magnitude of said voltage on a D.-C. electrical instrument to facilitate voltage adjustment or to connect a selected electrode to one terminal of the voltage source and to connect all other electrodes to the other terminal of the voltage source through said instrument.

2. The invention as recited in claim 1 including means effective upon operation of said switch means to apply to the electrodes a voltage of a polarity reverse to normal space conduction.

3. Apparatus for measuring the leakage resistance between selected electrodes of an electron tube, said apparatus comprising means to energize the tube heater element at a preselected voltage, a source of D.-C. voltage of predetermined magnitude, switch means manually operable to connect a selected electrode to one terminal of the voltage source and to connect the other electrodes to the other terminal of the voltage source through an electrical instrument having a pointer cooperating with a scale calibrated in resistance values, and means effective upon operation of said switch means to connect the selected electrode to that terminal of the voltage source which is reverse to normal space conduction.

4. Apparatus for measuring the leakage resistance between a selected electrode of an electron tube and the remaining tube electrodes, said apparatus comprising a D.-C. voltage source, an electrical instrument having a pointer cooperating with a scale calibrated in resistance values, a selector switch including means connecting together all but a selected one of the tube electrodes, circuit elements connecting the selected electrode to one terminal of the voltage source, circuit elements connecting the other tube electrodes to the other terminal of the voltage source, switch means operable to a first or second position, circuit elements connecting the instrument across the voltage source when the said switch means is in one position, means to adjust the magnitude of the D.-C. voltage to deflect the instrument pointer to a predetermined mark on the scale, and circuit elements connecting the instrument and the space path between the selected electrode and other electrodes in series across the voltage source when the said switch means is in the second position.

5. In an electron tube tester of the type including a socket for accommodating a tube under test, voltage sources corresponding to the rated voltages to be applied to the tube, a D.-C. indicating instrument and circuit elements for connecting the tube electrodes to the voltage sources, the improvement comprising a multi-deck switch manually-operable to one position to connect the instrument into the plate circuit of the tube and to another position to connect the instrument between a selected tube electrode and one terminal of one of the said voltage sources, and means effective when the said switch is in the said other position to disconnect the control electrodes and anode of the tube from the said voltage sources and to connect such electrodes to the other terminal of the said one voltage source.

6. The invention as recited in claim 5 wherein the instrument includes a reference mark on the scale and including a test switch operable to connect the instrument across the said one voltage source, and means manually adjustable to vary the voltage of said one voltage source to bring the instrument pointer into alignment with the said reference mark.

7. Tube testing apparatus comprising a socket accommodating the tube to be tested, sources of voltage corresponding to the rated voltages to be applied to the electrodes of the tube, a D.-C. indicating instrument having a plurality of calibrated scales, a fixed reference mark on the scale, a multi-deck switch operable to one position to connect the tube electrodes to the voltage sources and to another position to disconnect all tube electrodes except the heater from the voltage sources, said instrument and a space path in the tube being connected in series to one of the voltage sources when the said switch is in the said other position.

8. Tube testing apparatus comprising a socket accommodating a tube to be tested, a transformer having a primary winding and a plurality of secondary windings, means including an adjustable rheostat to energize the primary winding from a source of A.-C. power, leads connecting the tube heater to one of the secondary windings, a multi-deck gang switch operable to a first and a second position, circuit elements connecting the tube grid electrode to a second secondary winding through a rectifier when the said switch is in the said first position, means to adjust the voltage applied to the said grid to rated value, circuit elements connecting the tube anode to a third secondary winding through a rectifier when the said gang switch is in the said first position, means to adjust the voltage applied to the anode to rated value, a D.-C. indicating instrument having a scale calibrated in plate current values and a scale calibrated in resistance values, a reference mark on the instrument scale, a double-pole, double-throw switch normally-closed in one position, leads connecting the instrument to the movable contacts of the double-pole, double-throw switch, leads connecting the instrument into the tube anode circuit when the double-pole, double-throw switch is in the normally-closed position and the said gang switch is in the said first position, leads connecting the instrument to a D.-C. voltage of predetermined magnitude when the said double-pole, double-throw switch is closed in the other position, circuit elements effective when the said gang switch is in the second position to connect one tube electrode to one terminal of the D.-C. voltage and to connect the other tube electrodes to the other terminal of the D.-C. voltage through the said instrument.

9. The invention as recited in claim 8, wherein setting of the gang switch in the second position connects the tube heater to the negative terminal of the said D.-C. voltage and connects the tube cathode to the positive D.-C. voltage terminal.

10. The invention as recited in claim 8, wherein the said gang switch is operable to a third position wherein the control grid of the tube is connected to the negative terminal of the D.-C. voltage source and all other tube electrodes are connected to the positive D.-C. voltage terminal.

11. The invention as recited in claim 9, wherein the said gang switch is operable to a fourth position wherein the tube anode is connected to the positive terminal of the D.-C. voltage source and all other tube electrodes are connected to the negative D.-C. voltage terminal.

References Cited in the file of this patent

UNITED STATES PATENTS

| | | |
|---|---|---|
| 1,805,074 | Burtch | May 12, 1931 |
| 1,897,450 | Van Beusekom | Feb. 14, 1933 |
| 2,007,992 | Wenger | July 16, 1935 |
| 2,053,101 | Olesen | Sept. 1, 1936 |
| 2,092,896 | Stinchfield | Sept. 14, 1937 |
| 2,133,610 | Fausett | Oct. 18, 1938 |
| 2,492,733 | Burchell | Dec. 27, 1949 |
| 2,632,134 | Reid | Mar. 17, 1953 |
| 2,699,528 | Periale | Jan. 11, 1955 |
| 2,749,511 | Canning | June 5, 1956 |